(No Model.)

D. BROOKS, Jr.
AIR TIGHT COVERING FOR ELECTRIC CABLES.

No. 410,953. Patented Sept. 10, 1889.

Witnesses
L. Douville,
A. P. Jennings.

Inventor
David Brooks Jr
By his Attorneys
Diederohem + Kintner

UNITED STATES PATENT OFFICE.

DAVID BROOKS, JR., OF PHILADELPHIA, PENNSYLVANIA, ASSIGNOR TO THE ELECTRIC CABLE CONSTRUCTION AND MAINTENANCE COMPANY, OF SAME PLACE.

AIR-TIGHT COVERING FOR ELECTRIC CABLES.

SPECIFICATION forming part of Letters Patent No. 410,953, dated September 10, 1889.

Application filed December 29, 1888. Serial No. 295,110. (No model.)

*To all whom it may concern:*

Be it known that I, DAVID BROOKS, Jr., a citizen of the United States, residing in the city and county of Philadelphia, State of Pennsylvania, have invented a new and useful Improvement in Air-Tight or Protective Coverings for Electric Cables, which improvement is fully set forth in the following specification and accompanying drawings.

My invention consists of a protective covering for an electric cable embodying novel features whereby the cable is rendered impervious to moisture and air, as will be hereinafter set forth.

Figure 1:
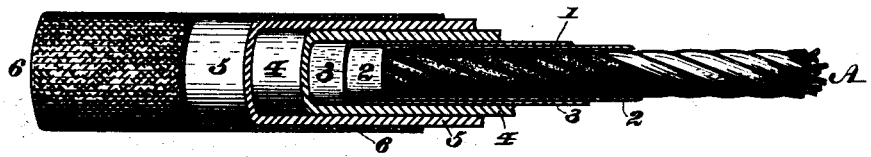
Figure 2:
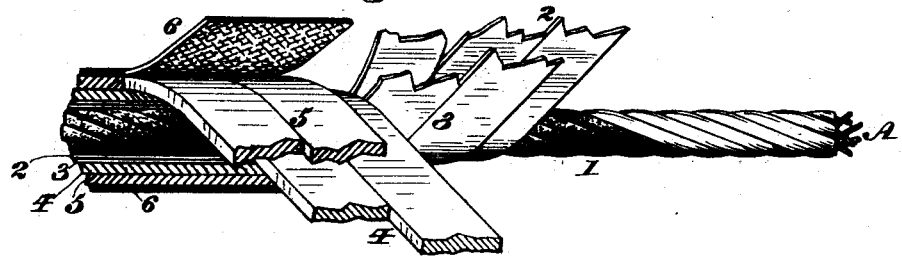

Figure 1 represents a partial side view and partial longitudinal section of an electric cable embodying my invention. Fig. 2 represents a partial side elevation and partial longitudinal section showing the members of the cable separated.

Similar letters and numerals of reference indicate corresponding parts in the two figures.

Referring to the drawings, A designates a bunch of wires which are covered with cotton or other fibrous material, which is saturated with an insulating substance in a heated or melted condition. While the cable is hot it is covered with a dry powder—such as flour or soapstone—forming a coating or cake *l*, which prevents the liquid subsequently from running.

The cable as prepared now receives its outside covering or incasement, consisting of tin-foil, rubber, and tape successively, as follows: two strips of tin-foil 2 3, two strips of rubber 4 5, and the exterior tape or wrapper 6. The foil and rubber are wound preferably spirally, so as to break joints, or otherwise applied over the respective parts, the exterior tape being braided fibrous material suitably painted or prepared with rubber, it being seen that the outside covering is impervious to moisture and air, producing superior results in the cable.

In some cases it may be desirable to employ a single layer of tin-foil and of rubber, or alternate tin-foil and rubber.

The insulating substance employed may be of any kind. I do not form any form of insulation for the wires but an air-tight covering composed of tin-foil and rubber vulcanized together, so as to form a solid impervious mass.

Having thus described my invention, what I claim as new, and desire to secure by Letters Patent, is—

1. An electric cable consisting of dry fibrous-covered wires saturated with an insulating material and having an incasement of tin-foil and rubber strips vulcanized, substantially as described.

2. An insulated bunch of wires having a covering composed of a layer of tin-foil, an outer covering of rubber, with an exterior wrapping of fibrous material having a rubber coating, said parts being combined substantially as described.

3. An electric cable consisting of wires having a fibrous covering with a saturation of insulating material, the latter being provided with a dry-powder coating, one or more layers of tin-foil surrounding said wires, one or more layers of rubber surrounding said tin-foil, and an exterior wrapper of fibrous material having a rubber coating, said parts being combined substantially as described.

4. An electric cable composed of fibrous-covered wires saturated with insulating material and coated with a dry powder, and an incasement of tin-foil and rubber, substantially as described.

5. An electric cable composed of fibrous-covered wires saturated with insulating material, having an impervious incasement consisting of tin-foil and rubber and an exterior wrapping of painted braid, substantially as described.

DAVID BROOKS, JR.

Witnesses:
JOHN A. WIEDERSHEIM,
JAMES F. KELLY.